(12) United States Patent
Hashimoto et al.

(10) Patent No.: US 8,053,082 B2
(45) Date of Patent: Nov. 8, 2011

(54) ADHESION-ENHANCED POLYIMIDE FILM, PROCESS FOR ITS PRODUCTION, AND LAMINATED BODY

(75) Inventors: Masafumi Hashimoto, Ube (JP); Takeshi Uekido, Ube (JP); Toshiyuki Nishino, Ube (JP); Toshihiko Anno, Ube (JP)

(73) Assignee: Ube Industries, Ltd. (JP)

( * ) Notice: Subject to any disclaimer, the term of this patent is extended or adjusted under 35 U.S.C. 154(b) by 363 days.

(21) Appl. No.: 10/591,749

(22) PCT Filed: Mar. 2, 2005

(86) PCT No.: PCT/JP2005/004014
§ 371 (c)(1),
(2), (4) Date: Sep. 6, 2006

(87) PCT Pub. No.: WO2005/090069
PCT Pub. Date: Sep. 29, 2005

(65) Prior Publication Data
US 2007/0196675 A1 Aug. 23, 2007

(30) Foreign Application Priority Data
Mar. 23, 2004 (JP) .................... 2004-084836

(51) Int. Cl.
*B32B 15/08* (2006.01)
*B32B 27/00* (2006.01)
*B05D 3/02* (2006.01)

(52) U.S. Cl. ............. 428/458; 428/473.5; 427/385.5
(58) Field of Classification Search .............. None
See application file for complete search history.

(56) References Cited

U.S. PATENT DOCUMENTS

| 5,114,757 A | 5/1992 | Linde et al. | |
| 6,117,510 A * | 9/2000 | Ishikawa et al. | 428/41.7 |
| 6,217,996 B1 * | 4/2001 | Yamamoto et al. | 428/220 |
| 6,962,726 B2 * | 11/2005 | Shigeta et al. | 427/96.1 |
| 7,338,716 B2 * | 3/2008 | Okamura et al. | 428/473.5 |

FOREIGN PATENT DOCUMENTS

| CN | 1231319 A | 10/1999 |
|---|---|---|
| EP | 0 431 636 A1 | 6/1991 |
| EP | 0 459 452 A2 | 12/1991 |
| EP | 0 538 075 A1 | 4/1993 |
| JP | 63-061030 A | 3/1988 |
| JP | 63-68641 A | 3/1988 |
| JP | 63-099282 A | 4/1988 |
| JP | 63-218349 A | 9/1988 |
| JP | 2-53932 A | 2/1990 |
| JP | 2-134241 A | 5/1990 |
| JP | 3-56541 A | 3/1991 |
| JP | 5-1160 A | 1/1993 |
| JP | 5-78505 A | 3/1993 |
| JP | 5-152378 A | 6/1993 |
| JP | 5-222219 A | 8/1993 |
| JP | 5-279497 A | 10/1993 |
| JP | 6-2828 A | 1/1994 |
| JP | 6-210794 A | 8/1994 |
| JP | 08-230103 | 9/1996 |
| JP | 9-048864 A | 2/1997 |
| JP | 9-316199 A | 12/1997 |
| JP | 10-12779 A | 1/1998 |
| JP | 11-29852 A | 2/1999 |
| JP | 2000-43211 A * | 2/2000 |
| JP | 2000-239423 A | 9/2000 |
| JP | 2002-096437 | 4/2002 |
| JP | 2003-251773 A | 9/2003 |

* cited by examiner

*Primary Examiner* — Monique R Jackson
(74) *Attorney, Agent, or Firm* — DLA Piper LLP (US)

(57) ABSTRACT

An adhesion-enhanced polyimide film which includes a core layer composed of a polyimide (a) having high rigidity and a low linear expansion coefficient, at least one side of which has a thin-layer formed by heating a coated layer including a heat-resistant surface treatment agent and a polyimide precursor which yields a highly heat-resistant amorphous polyimide (B).

12 Claims, No Drawings

ADHESION-ENHANCED POLYIMIDE FILM, PROCESS FOR ITS PRODUCTION, AND LAMINATED BODY

RELATED APPLICATION

This is a §371 of International Application No. PCT/JP2005/004014, with an international filing date of Mar. 2, 2005 (WO 2005/090069 A1, published Sep. 29, 2005), which is based on Japanese Patent Application No. 2004-084836, filed Mar. 23, 2004.

TECHNICAL FIELD

The present invention relates to an adhesion-enhanced polyimide film which is useful, as an electrical or electronic material, in the fields of electrical and electronic devices and semiconductors, which exhibits a sufficient practical level of peel strength for a laminated body obtained by lamination with a metal foil via an adhesive layer, and which has excellent dynamic characteristics, as well as to a process for its production and to a laminated body produced from it.

BACKGROUND

Polyimides, which have excellent properties including heat resistance, dimensional stability, dynamic characteristics, electrical properties, environmental resistance and flame retardance, as well as high flexibility, are widely used as flexible printed boards and tape automated bonding boards employed for mounting of semiconductor integrated circuits. In these fields, polyimide films are used as insulating supports for laminated bodies produced by lamination with metal foils, such as copper foils, via adhesives.

In recent years there has been increasing demand for thinner polyimide films with higher functionality, in the fields of electrical and electronic devices and semiconductors.

Polyimide films with higher rigidity and lower linear expansion coefficients are preferred for better handling properties during working and for higher dimensional precision of laminated bodies obtained by lamination with metal layers, but on the other hand such films also have inferior adhesive properties and give laminated bodies with lower peel strength, thus impairing the reliability of the obtained products. This tendency becomes more pronounced with smaller polyimide film thicknesses.

Many strategies have been proposed in the past to improve the adhesion of polyimide films. For example, it is known that using a polyimide film having a discharge-treated surface improves the peel strength of laminated bodies obtained by lamination with copper foils via adhesives or direct lamination with metal layers (Japanese Unexamined Patent Publication No. 63-61030, Japanese Unexamined Patent Publication No. 2-53932, Japanese Unexamined Patent Publication No. 2-134241, Japanese Unexamined Patent Publication No. 3-56541, Japanese Unexamined Patent Publication No. 5-1160, Japanese Unexamined Patent Publication No. 5-78505, Japanese Unexamined Patent Publication No. 5-152378, Japanese Unexamined Patent Publication No. 5-222219, Japanese Unexamined Patent Publication No. 5-279497, Japanese Unexamined Patent Publication No. 10-12779).

It is also known that using a polyimide film having its surface treated with a surface-treatment agent improves the peel strength of laminated bodies which are obtained by lamination with copper foils via adhesives or direct lamination with metal layers (Japanese Unexamined Patent Publication No. 63-68641, Japanese Unexamined Patent Publication No. 63-99282, Japanese Examined Patent Publication No. 6-2828, Japanese Unexamined Patent Publication No. 9-48864, Japanese Unexamined Patent Publication No. 11-29852).

Moreover, it is known that using a multilayer polyimide film obtained by laminating a polyimide film with another thermoplastic polymer, such as a thermoplastic polyimide thin layer, also improves the peel strength of laminated bodies obtained by lamination with copper foils via adhesives or direct lamination with metal layers (Japanese Unexamined Patent Publication No. 63-218349, Japanese Unexamined Patent Publication No. 6-210794, Japanese Unexamined Patent Publication No. 2003-251773).

However, the peel strengths of laminated bodies produced using such surface-modified polyimide films have been insufficient, and this situation has resulted in reduced productivity while also constituting an impediment to increased device sizes and complicating efforts at manufacture on a commercial scale.

For this reason, there have been proposed in recent years a method of performing treatment with a surface treatment agent after lamination of a polyimide film with a thermoplastic polyimide thin layer (Japanese Unexamined Patent Publication No. 2000-239423), and a method of performing treatment with a surface treatment agent after treatment of the polyimide film surface by plasma discharge (Japanese Unexamined Patent Publication No. 11-29852).

Nevertheless, there is much need of improvement because these polyimide films do not always provide sufficient peel strength to laminated bodies and, especially, to laminated bodies prepared by lamination with metal foils such as copper foils via adhesives, while organic materials other than polyimides are problematic due to inadequate mechanical properties (tensile modulus) or thermal properties (linear expansion coefficient).

SUMMARY

We provide a polyimide film which provides a practical level of peel strength in laminated bodies obtained by lamination with metal layers, and which exhibits adequate mechanical properties (tensile modulus) or thermal properties (linear expansion coefficient) as a film, as well as a process for its production and laminated bodies produced from it.

We provide an adhesion-enhanced polyimide film which comprises a core layer composed of a polyimide (A) having high rigidity and a low linear expansion coefficient, at least one side of which has a thin layer formed by heating a coated layer comprising a heat-resistant surface treatment agent and a polyimide precursor which yields an amorphous polyimide (B).

We further provide a process for production of an adhesion-enhanced polyimide film, wherein an organic solvent solution comprising a heat-resistant surface treatment agent and a polyimide precursor, which yields an amorphous polyimide (B) thin layer, is coated onto at least one side of a self-supporting film obtained from a polyimide precursor solution which yields a polyimide (A) core layer having high rigidity and a low linear expansion coefficient, to form a multilayer self-supporting film which is then heated and dried to complete imidation.

We still further provide an adhesion-enhanced polyimide film which is obtained by the aforementioned production process.

We also provide a flexible metal layer laminated body comprising a metal layer laminated directly or via an adhesive onto the aforementioned adhesion-enhanced polyimide film.

It is possible to obtain a polyimide film having enhanced adhesion while retaining the excellent properties of the polyimide film.

It is also possible to easily obtain the aforementioned polyimide film, and to obtain laminated bodies with adequate peel strength.

DETAILED DESCRIPTION

Selected, representative aspects include the following:

1) The aforementioned adhesion-enhanced polyimide film, wherein the polyimide (A) is obtained from 3,3',4,4'-biphenyltetracarboxylic dianhydride and p-phenylenediamine or p-phenylenediamine and 4,4'-diaminodiphenyl ether, from 3,3',4,4'-biphenyltetracarboxylic dianhydride and pyromellitic dianhydride and p-phenylenediamine or p-phenylenediamine and 4,4'-diaminodiphenyl ether, or from pyromellitic dianhydride and p-phenylenediamine and 4,4'-diaminodiphenyl ether.
2. The aforementioned adhesion-enhanced polyimide film, wherein the polyimide (A) is obtained using 3,3',4,4'-biphenyltetracarboxylic dianhydride and p-phenylenediamine as the main components (at 50 mole percent or greater to 100 mole percent of the total).
3. The aforementioned adhesion-enhanced polyimide film, wherein the polyimide (B) is obtained from at least one aromatic tetracarboxylic dianhydride selected from 2,3,3',4'-biphenyltetracarboxylic dianhydride, 2,2',3,3'-biphenyltetracarboxylic dianhydride, bis(3,4-dicarboxyphenyl)ether dianhydride, bis(2,3-dicarboxyphenyl)ether dianhydride and naphthalenetetracarboxylic dianhydride, and an aromatic diamine.
4. The aforementioned adhesion-enhanced polyimide film, wherein the aromatic diamine is at least one member selected from p-phenylenediamine and 4,4'-diaminodiphenyl ether.
5. The aforementioned adhesion-enhanced polyimide film, wherein the heat-resistant surface treatment agent is an aminosilane compound, an epoxysilane compound or a titanate compound.
6. The aforementioned adhesion-enhanced polyimide film, wherein the polyimide (A) core layer has a thickness of 10-35 μm.
7. The aforementioned adhesion-enhanced polyimide film, wherein the polyimide (B) thin-layer has a thickness of 0.05-1 μm.
8. The aforementioned adhesion-enhanced polyimide film, wherein the polyimide film as a whole has a tensile modulus (MD) of between 6 GPa and 12 GPa and a linear expansion coefficient of $5 \times 10^{-6}$ to $30 \times 10^{-6}$ cm/cm/° C. (at 50-200° C.), preferably $10 \times 10^{-6}$ to $30 \times 10^{-6}$ cm/cm/° C. (at 50-200° C.).

It is an essential aspect of the process that an organic solvent solution comprising a heat-resistant surface treatment agent and a polyimide precursor, which yields a thin layer composed of an amorphous polyimide (B), is coated onto at least one side of a self-supporting film obtained from a polyimide precursor solution which yields a core layer composed of a polyimide (A) having high rigidity and a low linear expansion coefficient, to form a multilayer self-supporting film which is then heated and dried to complete imidation, and it is thereby possible to obtain an adhesion-enhanced polyimide film exhibiting a high practical level of peel strength for a laminated body obtained by lamination with a metal foil via an adhesive layer, as well as adequate mechanical properties (tensile modulus) and thermal properties (linear expansion coefficient) for the film as a whole.

The self-supporting film obtained from the precursor solution which yields a core layer composed of polyimide (A) is produced by casting and heating on a substrate an aromatic polyamic acid solution obtained by polymerization of an aromatic tetracarboxylic acid component and an aromatic diamine component in substantially equimolar amounts, in an organic polar solvent.

The aromatic tetracarboxylic acid used to produce the polyimide (A) is not particularly restricted so long as it yields a polyimide film with high rigidity and a low linear expansion coefficient, i.e. having a tensile modulus (MD) of between 6 GPa and 12 GPa and a linear expansion coefficient of $5 \times 10^{-6}$ to $30 \times 10^{-6}$ cm/cm/° C. (at 50-200° C.), and various different aromatic tetracarboxylic acids may be used. Preferably, there may be mentioned 3,3',4,4'-biphenyltetracarboxylic and pyromellitic acid, or their acid dianhydrides or acid esters. Other aromatic tetracarboxylic acid dianhydrides may also be used in combination provided that the properties of the polyimide film are not impaired.

The aromatic diamine used to produce the polyimide (A) is not particularly restricted so long as it yields a polyimide film with high rigidity and a low linear expansion coefficient, i.e. having a tensile modulus (MD) of between 6 GPa and 12 GPa and a linear expansion coefficient of $5 \times 10^{-6}$ to $30 \times 10^{-6}$ cm/cm/° C. (at 50-200° C.), and various different aromatic diamines may be used. Preferably, there may be mentioned 1,4-diaminobenzene (p-phenylenediamine), 4,4'-diaminodiphenyl ether and 3,3'-diaminodiphenyl ether. Other aromatic diamines may also be used in combination provided that the properties of the polyimide film are not impaired.

As the organic polar solvents there may be mentioned amides such as N-methyl-2-pyrrolidone, N,N-dimethylacetamide, N,N-diethylacetamide, N,N-dimethylformamide, N,N-diethylformamide and hexamethylsulfonamide, sulfoxides such as dimethylsulfoxide and diethylsulfoxide, and sulfones such as dimethylsulfone and diethylsulfone. These solvents may be used alone or in combinations.

For the polymerization reaction, the total monomer concentration in the organic polar solvent is 5-40 wt %, preferably 6-35 wt % and most preferably 10-30 wt %.

The polymerization reaction between the aromatic tetracarboxylic acid component and the aromatic diamine component may be carried out, for example, by combining them in approximately equimolar amounts and conducting the reaction at a reaction temperature of no higher than 100° C. and preferably no higher than 80° C. for a period of about 0.2-60 hours to obtain a polyamic acid (polyimide precursor) solution.

The polyamic acid solution to produce the polyimide (A) has a rotational viscosity of about 0.1-50,000 poise, especially 0.5-30,000 poise and more preferably about 1-20,000 poise when measured at 30° C., for suitable handleability of the polyamic acid solution. The polymerization reaction is therefore preferably carried out until the produced polyamic acid solution exhibits a viscosity in the aforementioned range.

For the purpose of limiting gelling of the polyamic acid, a phosphorus-based stabilizer such as triphenyl phosphite or triphenyl phosphate may be added in a range of 0.01-1% with respect to the solid (polymer) concentration during polymerization of the polyamic acid. In order to accelerate imidation, a basic organic compound may also be added to the dope solution. For example, imidazole, 2-methylimidazole, 1,2-dimethylimidazole, 2-phenylimidazole, benzimidazole, isoquinoline or a substituted pyridine may be used at a proportion of 0.05-10 wt % and especially 0.1-2 wt % with respect to the polyamic acid. Since these components form polyimide films at relatively low temperatures, they may be used to avoid insufficient imidation. In order to stabilize the adhesive strength, an organic aluminum compound, inorganic aluminum compound or organic tin compound may be added to a thermocompression bonding polyimide starting dope. For example, aluminum hydroxide, aluminum triacetylacetonate or the like may be added in a proportion of 1 ppm or greater and especially 1-1000 ppm with respect to the polyamic acid.

For production of a self-supporting film composed of the polyimide (A) precursor solution, first the aromatic polyamic acid solution may be cast onto the surface of an appropriate support (for example, a metal, ceramic or plastic roll, a metal belt, or a roll or belt supplied with metal thin-film tape), to form a film of the polyamic acid solution to a uniform thickness of about 10-2000 μm, and especially about 20-1000 μm. Next, a heat source such as hot air or infrared rays is used for heating to 50-210° C. and especially 60-200° C. for removal of the excess solvent, to accomplish pre-drying to a self-supporting condition, after which the self-supporting film is released from the support.

The released self-supporting film preferably has a heat loss in the range of 20-40 wt %, and an imidation rate in the range of 8-40%. If the imidation rate is too high, the adhesive strength with the polyimide (B) thin layer will be weak and will tend to result in peeling. If the imidation rate is too low, on the other hand, air bubbles, fissures, crazes, cracks and the like may be observed in the polyimide film or the polyimide film may have impaired dynamic properties, after coating or drying of the polyimide precursor organic solvent solution for the polyimide (B) thin layer, or after polyimidation.

The heat loss of the self-supporting film is the value determined by drying the film to be measured at 420° C. for 20 minutes, measuring the weight before drying W1 and the weight after drying W2 and performing calculation by the following formula:

Heat loss(wt %)=((W1−W2)/W1)×100.

The imidation rate of the self-supporting film may be determined by a method employing the Carl Fischer moisture meter described in Japanese Unexamined Patent Publication No. 9-316199 or IR analysis.

If necessary, trace amounts of inorganic or organic additives may be added inside the self-supporting film or on the surface layer. As inorganic additives there may be mentioned particulate or flat inorganic fillers. The amount used and their shapes (sizes and aspect ratios) are preferably selected depending on the purpose of use.

According to the process, an organic solvent solution comprising a heat-resistant surface treatment agent and a polyimide precursor which yields an amorphous polyimide (B) thin layer is coated onto at least one side of a self-supporting film obtained from a polyimide precursor solution, which yields a polyimide (A) core layer, to form a multilayer self-supporting film.

As heat-resistant surface treatment agents there may be mentioned aminosilane-based, epoxysilane-based and titanate-based surface treatment agents. As aminosilane-based surface treatment agents there may be mentioned compounds such as γ-aminopropyl-triethoxysilane, N-β-(aminoethyl)-γ-aminopropyl-triethoxysilane, N-(aminocarbonyl)-γ-aminopropyl-triethoxysilane, N-[β-(phenylamino)-ethyl]-γ-aminopropyl-triethoxysilane, N-phenyl-γ-aminopropyl-triethoxysilane and γ-phenylaminopropyltrimethoxysilane, as epoxysilane-based surface treatment agents there may be mentioned compounds such as β-(3,4-epoxycyclohexyl)-ethyl-trimethoxysilane and γ-glycidyloxypropyl-trimethoxysilane, and as titanate-based surface treatment agents there may be mentioned compounds such as isopropyl-tricumylphenyl-titanate and dicumylphenyl-oxyacetate-titanate.

It is essential to combine the heat-resistant surface treatment agent with a polyimide precursor which yields a thin layer of the amorphous polyimide (B). If either the heat-resistant surface treatment agent or a polyimide precursor which yields a thin layer of the amorphous polyimide (B) is used alone, the resulting polyimide film will not have adhesion enhanced to a practical level and, particularly, the adhesion will be too low for practical use if the thin-layer film has a thickness of less than 40 μm.

The tetracarboxylic acid component of the polyimide precursor which yields a thin-layer of the amorphous polyimide (B) is not particularly restricted so long as it is a tetracarboxylic acid dianhydride which yields an amorphous polyimide, and preferably there may be mentioned aromatic tetracarboxylic dianhydrides selected from 2,3,3',4'-biphenyltetracarboxylic dianhydride, 2,2',3,3'-biphenyltetracarboxylic dianhydride, bis(3,4-dicarboxyphenyl)ether dianhydride, bis(2,3-dicarboxyphenyl)ether dianhydride and naphthalenetetracarboxylic dianhydride.

The term "amorphous" used above refers to a crystallinity of no greater than 5%, preferably no greater than 2% and most preferably 0%.

The diamine for the polyimide precursor which yields the highly heat-resistant amorphous polyimide (B) thin layer is not particularly restricted so long as it is a diamine which yields a heat-resistant polyimide having a glass transition temperature of 300° C. or above or not observed at a temperature below 300° C., and the aromatic diamines of p-phenylenediamine and 4,4'-diaminodiphenyl ether may be mentioned as preferred diamines.

The organic solvent solution comprising the heat-resistant surface treatment agent and the polyimide precursor which yields the highly heat-resistant amorphous polyimide (B) thin layer may be used in a proportion so that the total monomer concentration in the organic solvent is 1-15 wt % and especially 2-8 wt %, and the polymerization reaction between the aromatic tetracarboxylic acid component and the aromatic diamine component in the organic solvent may be carried out by combining them in approximately equimolar amounts and conducting the reaction at a reaction temperature of no higher than 100° C. and preferably no higher than 80° C. for a period of about 0.2-60 hours.

The polyamic acid (polyimide precursor) solution preferably has a rotational viscosity of about 0.1-5000 poise, especially 0.5-2000 poise and more preferably about 1-2000 poise when measured at 30° C., for suitable handleability of the polyamic acid solution. The polymerization reaction is therefore preferably carried out until the produced polyamic acid solution exhibits a viscosity in the aforementioned range.

The organic solvent solution comprising the polyimide precursor which yields the amorphous polyimide (B) thin-layer is obtained by adding the heat-resistant surface treatment agent in a proportion of 1-15 wt % and especially 2-8 wt % with respect to the polyimide precursor.

As the organic solvents, there may preferably be employed, for example, those exemplified hereinbefore as the solvents for the aromatic polyamic acid solution to produce the polyimide (A).

The sol solution obtained by the method described above may be coated onto at least one side (or both sides if necessary) of the self-supporting aromatic polyimide precursor film by a publicly known coating method such as gravure coating, spin coating, silk screen coating, dip coating, spray coating, bar coating, knife coating, roll coating, blade coating, die coating or the like.

The coated product (laminated body) prepared in this manner is preferably anchored with a pin tenter, clip, metal or the like and heated to hardness. The heat treatment preferably involves primary heat treatment at 200-300° C. for 1-60 minutes, followed by secondary heat treatment at 300-370° C. for 1-60 minutes and then tertiary heat treatment at a maximum heating temperature of 370-550° C. for 1-30 minutes. The heat treatment is preferably carried out in such a stepwise fashion. If the primary heating temperature is lower than 200° C., the polyimide may undergo hydrolysis by the water produced during formation of metal oxides, thereby lowering the dynamic properties and often resulting in cracks in the film. The heat treatment may be carried out using any publicly known apparatus such as a hot furnace, infrared heating furnace or the like.

The multilayer polyimide film is an adhesion-enhanced polyimide film which comprises a core layer composed of a polyimide (A) having high rigidity and a low linear expansion coefficient, at least one side of which has a thin layer formed by heating a coated layer comprising a heat-resistant surface treatment agent and a polyimide precursor which yields a highly heat-resistant amorphous polyimide (B), and preferably the polyimide (A) core layer has a thickness of 10-35 μm and the polyimide (B) thin layer has a thickness of 0.05-1 μm.

The polyimide film as a whole preferably has a tensile modulus (MD) of between 4.5 GPa and 12 GPa, preferably between 6 GPa and 12 GPa, and especially between 7 GPa and 12 GPa, and a linear expansion coefficient of $5 \times 10^{-6}$ to $30 \times 10^{-6}$ cm/cm/° C. (at 50-200° C.).

The multilayer polyimide film is preferably used as a base film for a laminated flexible metal foil laminated body or a sputtered metal clad laminated body, or as a base film for a metal vapor deposited film, and especially as the base film of a flexible metal foil laminated body.

The process for production of the metal foil laminated body may be any publicly known process, such as the process described in "Print Kairo Gijutsu Binran" [Printed Circuit Technique Handbook] (Nikkan Kogyo Shinbun, 1993).

The polyimide film may be used directly or, if necessary, after subjecting the thin-layer surface to corona discharge treatment, low-temperature plasma discharge treatment or ordinary-pressure plasma discharge treatment, for lamination with a metal foil via an adhesive to obtain a laminated body.

The adhesive used may be thermosetting or thermoplastic, and for example, there may be mentioned thermosetting adhesives such as an epoxy resins, NBR-phenol based resins, phenol-butyral based resins, epoxy-NBR based resins, epoxy-phenol based resins, epoxy-nylon based resins, epoxy-polyester based resins, epoxy-acrylic resins, acrylic resins, polyamide-epoxy-phenol based resins, polyimide based resins, maleimide resins, polyimide-epoxy resins and polyimidosiloxane-epoxy resins, or thermoplastic adhesives such as polyamide based resins, polyester based resins, polyimide based adhesives and polyimidosiloxane based adhesives.

Preferred adhesives include thermosetting adhesives such as polyamide-epoxy-phenol based resins, polyimidosiloxane-epoxy based resins and acrylic based resins, and thermoplastic adhesives such as polyimide based resins and polyimidosiloxane-epoxy based resins.

The adhesive used preferably has a 150° C. elastic modulus (MD, TD) of 10 MPa to 1 GPa, a 25-150° C. linear expansion coefficient of 50-300 ppm/° C., and a haze of no greater than 10. The polyamide in a polyamide-epoxy-phenol based resin preferably has an acid value of 0 or greater and especially 3 or greater, and preferably comprises as the acid component a dicerboxylic acid (dimer acid) with 36 or more carbon atoms.

A laminated body may be easily produced in a continuous manner by, for example, coating the thin-layer surface of a polyimide film of the invention with a solution of the aforementioned adhesive and drying the coated layer at a temperature of about 80-200° C. for a period from 20 seconds to 100 minutes to form a thin film of the adhesive from which the solvent has been substantially removed to 1 wt % or less and preferably a solvent residue of no greater than 0.5 wt % (with a dry film or sheet thickness of about 1-20 μm), or by coating and drying a solution of the adhesive onto a resin film made of an aromatic polyester, polyolefin or the like to form a thin-film layer of the adhesive, subsequently combining it with the transferring thin-film layer side of the polyimide film of the invention to transfer the adhesive thin-film layer, forming a laminated body (sheet) with a metal foil such as a rolled copper foil, electrolytic copper foil, aluminum foil, stainless steel foil or the like, preferably with a rolled copper foil or electrolytic copper foil, and, in the case of a thermosetting adhesive, for example, performing lamination at a temperature of 80-200° C. and especially 100-180° C. under pressurization (0.2-50 kg/cm$^2$) followed by heating in a temperature range of 150-250° C. for 1-24 hours for thermosetting, or in the case of a thermoplastic adhesive, for example, performing lamination at a temperature above the softening point of the adhesive and no higher than 350° C., under pressurization (0.2-100 kg/cm$^2$).

This process can produce a laminated body which is laminated with a metal foil such as a copper foil, has a peel strength of 800 N/m or greater and exhibits mechanical properties (tensile modulus) and thermal properties (linear expansion coefficient) suitable for an entire polyimide layer.

Throughout the present specification, the peel strength is the value measured for a laminated body obtained by laminating the polyimide film with an electrolytic copper foil (35 μm) via an adhesive, by a T peel test (pull speed: 50 mm/min).

The imidation rate was determined by IR analysis.

The tensile modulus was measured according to ASTM D882.

The linear expansion coefficient (average of MD, TD; 50-200° C.) was measured for a sample heated at 300° C. for 30 minutes for stress relaxation using a TMA (Thermal Mechanical Analysis) apparatus (tensile mode, 2 g load, 10 mm sample length, 20° C./min).

The crystallinity was determined by obtaining the X-ray diffraction spectrum for the polyimide film target of crystallinity measurement (25 μm thickness) by wide angle X-ray diffraction, and analyzing the X-ray diffraction spectrum by the Ruhland method.

Selected, representative aspects will now be explained in greater detail by examples and comparative examples.

Reference Example 1

3,3',4,4'-Biphenyltetracarboxylic dianhydride and an equimolar amount of p-phenylenediamine were polymerized in N,N-dimethylacetamide to obtain an 18 wt % polyamic acid solution. To the polyamic acid solution there were added 0.1 part by weight of a mono-stearyl phosphate triethanolamine salt with respect to 100 parts by weight of polyamic acid, colloidal silica with a mean particle size of 0.08 μm, and then 0.05 mole of 1,2-dimethylimidazole with respect to 1 mole of amic acid, and the mixture was uniformly blended to obtain a polyimide (A) precursor solution composition.

Reference Example 2-1

2,3,3',4'-Biphenyltetracarboxylic dianhydride and an equimolar amount of p-phenylenediamine were polymerized in N,N-dimethylacetamide to obtain a 3.0 wt % polyamic acid solution. To the polyamic acid solution there was added γ-phenylaminopropyltrimethoxysilane in a proportion to provide a 3 wt % concentration in the solution, and the mixture was uniformly blended to obtain a polyimide (B) precursor solution composition.

The polyimide (B) precursor solution composition for the thin layer was used to separately form a film for crystallinity measurement, which yielded a value of 0%.

Reference Example 2-2

A polyimide (B) precursor solution composition was obtained in the same manner as Reference Example 2-1, except that the polyamic acid concentration was changed to 5.0 wt %.

Reference Example 2-3

A polyimide (B) precursor solution composition was obtained in the same manner as Reference Example 2-1, except that 4,4'-diaminodiphenyl ether was used instead of p-phenylenediamine as the aromatic diamine.

The polyimide (B) precursor solution composition for the thin layer was used to separately form a film for crystallinity measurement, which yielded a value of 0%.

Reference Example 2-4

A polyimide (B) precursor solution composition was obtained in the same manner as Reference Example 2-3, except that the polyamic acid concentration was changed to 5.0 wt %.

Comparative Reference Example 1

A coating solution composition was obtained in the same manner as Reference Example 2-1, except that only γ-phenylaminopropyltrimethoxysilane was added.

Comparative Reference Example 2

A polyimide (B) precursor solution composition was obtained in the same manner as Reference Example 2-1, except that no γ-phenylaminopropyltrimethoxysilane was added.

Example 1

The polyimide (A) precursor solution composition obtained in Reference Example 1 was used as a base film dope and cast onto a stainless steel substrate to a heat-dried film thickness of 35 μm, and then was continuously dried with hot air at 140° C. and released from the substrate to obtain a self-supporting film (imidation rate: 11% at air side and 17% at support side, heat loss: 38%). The thin-layer polyimide (B) precursor solution composition obtained in Reference Example 2-1 was coated onto the support contact side of the self-supporting film using a die coater to a heat-dried thickness of 0.10 μm, and then the temperature was gradually raised from 200° C. to 575° C. in a hot furnace for solvent removal and imidation to obtain a polyimide film. The obtained polyimide film was then evaluated.

The thin-layer side of the polyimide film was laminated (180° C., 20 kgf/cm$^2$) with an electrolytic copper foil (35 μm, T-8 by Fukuda Metal Foil & Powder Co., Ltd.) via an adhesive (acrylic adhesive, PYRALUX-LF0100 by DuPont) to obtain a laminated body.
  Base film thickness: 35 μm
  Thin-layer thickness: 0.10 μm
  Tensile modulus: 0.94 GPa
  Linear expansion coefficient (50-200° C.): 14×10$^{-6}$ cm/cm/° C.
  Thin-layer coated side: support side
  Peel strength (support side): 1140 N/m
  Peel side: Cu/adhesive Example 2

A polyimide film and laminated body were obtained in the same manner as Example 1, except that the thin-layer polyimide (B) precursor solution composition obtained in Reference Example 2-2 was used as the thin-layer polyimide (B) precursor solution composition and was coated onto the air side (opposite the support contact side) of the self-supporting film to a heat-dried thickness of 0.18 μm.

The evaluation results were as follows.
  Base film thickness: 35 μm
  Thin-layer thickness: 0.18 μm
  Linear expansion coefficient (50-200° C.): 18×10$^{-6}$ cm/cm/° C.
  Tensile modulus: 0.90 GPa
  Thin-layer coated side: air side
  Peel strength (air side): 1470 N/m
  Peel side: Cu/adhesive Example 3

A polyimide film and laminated body were obtained in the same manner as Example 1, except that the thin-layer polyimide (B) precursor solution composition obtained in Reference Example 2-3 was used as the thin-layer polyimide (B) precursor solution composition and was coated onto both sides of the self-supporting film to a heat-dried thickness of 0.10 μm on each side.

The evaluation results were as follows.
  Base film thickness: 35 μm
  Thin-layer thickness: 0.10 μm
  Linear expansion coefficient (50-200° C.): 15×10$^{-6}$ cm/cm/° C.
  Tensile modulus: 0.95 GPa
  Thin-layer coated side: support side and air side
  Peel strength (support side): 1140 N/m
  Peel strength (air side): 1370 N/m
  Peel side: Cu/adhesive (both sides)

The polyimide (B) for the thin layer was used for separate crystallinity measurement, which yielded a value of 0%.

Example 4

A polyimide film and laminated body were obtained in the same manner as Example 1, except that the thin-layer polyimide (B) precursor solution composition obtained in Reference Example 2-4 was used as the thin-layer polyimide (B) precursor solution composition and was coated onto the air side of the self-supporting film to a heat-dried thickness of 0.18 μm.

The evaluation results were as follows.
  Base film thickness: 35 μm
  Thin-layer thickness: 0.18 μm
  Linear expansion coefficient (50-200° C.): 19×10$^{-6}$ cm/cm/° C.

Tensile modulus: 0.90 GPa
Thin-layer coated side: air side
Peel strength (air side): 1480 N/m
Peel side: Cu/adhesive Example 5

A polyimide film and laminated body were obtained in the same manner as Example 1, except that the thickness of the heat-dried film was changed from 35 μm to 12.5 μm.
The evaluation results were as follows.
Base film thickness: 12.5 μm
Thin-layer thickness: 0.10 μm
Linear expansion coefficient (50-200° C.): $11 \times 10^{-6}$ cm/cm/° C.
Tensile modulus: 0.98 GPa
Thin-layer coated side: air side
Peel strength (support side): 980 N/m
Peel side: Cu/adhesive Example 6

A polyimide film and laminated body were obtained in the same manner as Example 2, except that the thickness of the heat-dried film was changed from 35 μm to 12.5 μm.
The evaluation results were as follows.
Base film thickness: 12.5 μm
Thin-layer thickness: 0.18 μm
Linear expansion coefficient (50-200° C.): $12 \times 10^{-6}$ cm/cm/° C.
Tensile modulus: 0.80 GPa
Thin-layer coated side: air side
Peel strength (air side): 900 N/m
Peel side: Cu/adhesive Example 7

A polyimide film and laminated body were obtained in the same manner as Example 3, except that the thickness of the heat-dried film was changed from 35 μm to 12.5 μm.
The evaluation results were as follows.
Base film thickness: 12.5 μm
Thin-layer thickness: 0.10 μm
Linear expansion coefficient (50-200° C.): $10 \times 10^{-6}$ cm/cm/° C.
Tensile modulus: 0.88 GPa
Thin-layer coated side: support side and air side
Peel strength (support side): 1180 N/m
Peel strength (air side): 1100 N/m
Peel side: Cu/adhesive (both sides)

Example 8

A polyimide film and laminated body were obtained in the same manner as Example 4, except that the thickness of the heat-dried film was changed from 35 μm to 12.5 μm.
The evaluation results were as follows.
Base film thickness: 12.5 μm
Thin-layer thickness: 0.18 μm
Linear expansion coefficient (50-200° C.): $13 \times 10^{-6}$ cm/cm/° C.
Tensile modulus: 0.98 GPa
Thin-layer coated side: air side
Peel strength (air side): 1070 N/m
Peel side: Cu/adhesive (air side)

Comparative Example 1

A polyimide film and laminated body were obtained in the same manner as Example 5, except that the coating solution composition obtained in Comparative Reference Example 1 was coated onto the support side of the self-supporting film instead of the thin-layer polyimide (B) precursor solution composition.
The evaluation results were as follows.
Base film thickness: 35 μm
Thin-layer thickness: 0.0 μm
Linear expansion coefficient (50-200° C.): $14 \times 10^{-6}$ cm/cm/° C.
Tensile modulus: 0.96 GPa
Thin-layer coated side: support side
Peel strength (support side): 360 N/m
Peel side: film/adhesive Comparative Example 2

A polyimide film and laminated body were obtained in the same manner as Example 5, except that the polyimide (B) precursor solution composition obtained in Comparative Reference Example 2 was coated as the thin-layer polyimide (B) precursor solution composition onto the support side of the self-supporting film.
The evaluation results were as follows.
Base film thickness: 35 μm
Thin-layer thickness: 0.10 μm
Linear expansion coefficient (50-200° C.): $17 \times 10^{-6}$ cm/cm/° C.
Tensile modulus: 0.92 GPa
Thin-layer coated side: support side
Peel strength (support side): 600 N/m
Peel side: film/adhesive Example 9

A laminated body was obtained in the same manner as Example 5, except that the polyimide film obtained in Example 5 was used with a different electrolytic copper foil (12 μm, NA-VLP-12, product of Mitsui Kinzoku Kogyo Co., Ltd.) as the copper foil.
The laminated body was then evaluated.
Peel strength (support side): 1100 N/m
Peel side: Cu/adhesive Example 10

A laminated body was obtained in the same manner as Example 5, except that the polyimide film obtained in Example 7 was used with a different electrolytic copper foil (12 μm, NA-VLP-12, product of Mitsui Kinzoku Kogyo Co., Ltd.) as the copper foil.
The laminated body was then evaluated.
Peel strength (support side): 960 N/m
Peel side: Cu/adhesive Comparative Example 3

A laminated body was obtained in the same manner as Example 9, except that the obtained polyimide film was used without coating the thin-layer polyimide (B) precursor solution composition onto the self-supporting film.
The laminated body was then evaluated.
Peel strength (support side): 80 N/m
Peel side: film/adhesive

The invention claimed is:
1. An adhesion-enhanced polyimide film which comprises a core layer composed of a polyimide (A) having high rigidity and a low linear expansion coefficient, at least one side of which has a thin-layer with a thickness of 0.05 to 1 µm formed by heating a coated layer comprising a) a heat-resistant surface treatment agent selected from N-[β-(phenylamino)-ethyl]-γ-aminopropyl-triethoxysilane, N-phenyl-γ-aminopropyl-triethoxysilane and γ-phenylaminopropyl-triethoxysilane and b) a polyimide precursor obtained from two components consisting of i) at least one aromatic tetracarboxylic dianhydride selected from the group consisting of 2,3,3',4'-biphenyltetracarboxylic dianhydride and 2,2',3,3'-biphenyltetracarboxylic dianhydride and ii) at least one aromatic diamine selected from, the group consisting of p-phenylenediamine and 4,4'-diaminodiphenyl ether, which yields a highly heat-resistant amorphous polyimide (B), wherein the polyimide film is obtained by heating at a maximum heating temperature of 370-575° C. a multilayer self-supporting film obtained by coating an organic solvent solution comprising the heat-resistant surface treatment agent and the polyimide precursor which yields the highly heat-resistant amorphous polyimide (B) onto at least one side of a self-supporting film obtained from a polyimide precursor solution which yields the polyimide (A) core layer, and wherein the polyimide film as a whole has a tensile modulus (MD) of between 6 GPa and 12 GPa and a linear expansion coefficient of $5 \times 10^{-6}$ to $30 \times 10^{-6}$ cm/cm/° C. (at 50-200° C.).

2. The adhesion-enhanced polyimide film according to claim 1, wherein the polyimide (A) is obtained from 3,3',4,4'-biphenyltetracarboxylic dianhydride and p-phenylenediamine or p-phenylenediamine and 4,4'-diaminodiphenyl ether, from 3,3',4,4'-biphenyltetracarboxylic dianhydride and pyromellitic dianhydride and p-phenylenediamine or p-phenylenediamine and 4,4'-diaminodiphenyl ether, or from pyromellitic dianhydride and p-phenylenediamine and 4,4'-diaminodiphenyl ether.

3. The adhesion-enhanced polyimide film according to claim 1, wherein the polyimide (A) is obtained using 3,3',4,4'-biphenyltetracarboxylic dianhydride and p-phenylenediamine as the main components at 50 mole percent or greater to 100 mole percent of the total.

4. The adhesion-enhanced polyimide film according to claim 1, wherein the polyimide (A) core layer has a thickness of 10 to 35 µm.

5. An adhesion-enhanced polyimide film in which a metal layer is laminated via an adhesive onto an adhesion-enhanced polyimide film according to claim 1.

6. A flexible metal foil laminated body comprising a metal layer laminated via an adhesive onto an adhesion-enhanced polyimide film according to claim 1.

7. A flexible metal foil laminated body comprising a metal layer laminated via an adhesive onto an adhesion-enhanced polyimide film according to claim 2.

8. A flexible metal foil laminated body comprising a metal layer laminated via an adhesive onto an adhesion-enhanced polyimide film according to claim 3.

9. The adhesion-enhanced polyimide film according to claim 1, which is used to directly laminate the polyimide (B) layer onto an adhesive layer for adhesion to a metal layer.

10. The adhesion-enhanced polyimide film according to claim 1, wherein the self-supporting film obtained from the polyimide precursor solution which yields the polyimide (A) core layer has a heat loss in a range of 20-40 wt% and an imidation rate in a range 8-40%.

11. The adhesion-enhanced polyimide film according to claim 1, wherein the organic solvent solution comprising the polyimide precursor which yields a polyimide (B) thin layer is obtained by adding the heat-resistant surface treatment agent in a proportion of 1-15 wt% with respect to the polyimide precursor.

12. A laminated body comprising an adhesive layer for adhesion to a metal layer formed onto the polyimide (B) layer of the adhesion enhanced polyimide film according to claim 1.

* * * * *